United States Patent [19]
Sonne et al.

[11] Patent Number: 5,298,753
[45] Date of Patent: * Mar. 29, 1994

[54] ARRANGEMENT FOR COUNTING LIQUID SCINTILLATION SAMPLES ON BOTTOM-WINDOW MULTI-WELL SAMPLE PLATES

[75] Inventors: Vesa Sonne, Vanhalinna; Markku Varjonen, Turku; Kauko Lehtinen, Raisio; Tapio Yrjönen, Turku; Stefan Järnström, Pargas, all of Finland

[73] Assignee: Wallac Oy, Turku, Finland

[*] Notice: The portion of the term of this patent subsequent to Mar. 15, 2011 has been disclaimed.

[21] Appl. No.: 16,976

[22] Filed: Feb. 12, 1993

Related U.S. Application Data

[63] Continuation of Ser. No. 974,624, Nov. 12, 1992.

[51] Int. Cl.$^5$ .............................................. G01T 1/204
[52] U.S. Cl. ..................................... 250/364; 250/328
[58] Field of Search ........... 250/328, 362, 364, 361 C; 356/244

[56] References Cited

U.S. PATENT DOCUMENTS

| | | | |
|---|---|---|---|
| 3,844,428 | 10/1974 | Olsen | 250/328 X |
| 5,043,581 | 8/1991 | Joss | 250/328 |
| 5,061,853 | 10/1991 | Lehtinen et al. | 250/328 |

*Primary Examiner*—Constantine Hannaher
*Assistant Examiner*—Edward J. Glick
*Attorney, Agent, or Firm*—Adduci, Mastriani, Schaumberg & Schill

[57] ABSTRACT

An arrangement for counting liquid scintillation samples on bottom-window multi-well sample plates in a liquid scintillation counter. The sample plates include a plurality of samples wells having light impermeable side walls and a light permeable bottom sheet which covers and forms the bottoms of said sample wells. The liquid scintillation counter includes at least one photomultiplier tube and a sample plate holder. The sample plate holder includes a device to hold sample plates of different sizes and a device to enable transporting of the sample plate holder by the scintillation counter. For preventing light passage between sample wells in the permeable bottom sheet a light permeable adhesive foil provided with black lines or other light passage preventing treatment between the sample wells is attached to the bottom side of the sample plate. In cases where the samples on the sample plate are measured from the top by a single photomultiplier tube the foil is reflective to reflect scintillation light to the photomultiplier tube. In cases where the samples on the sample plate are measured from the bottom by a single photomultiplier tube a reflective adhesive foil is attached to the top of the sample plate to reflect scintillation light to the photomultiplier tube.

7 Claims, 6 Drawing Sheets

ARRANGEMENT FOR COUNTING LIQUID SCINTILLATION SAMPLES ON BOTTOM-WINDOW MULTI-WELL SAMPLE PLATES

This application is a continuation of application Ser. No. 07/974,624 filed Nov. 12, 1992.

BACKGROUND OF THE INVENTION

Liquid scintillation counters are mainly used for measuring low energy beta radiation emitting samples, which are of, for example, biological or medical interest.

The range of the low energy beta particles in the sample is generally few tens of micrometers at the most. As a consequence, the sample to be measured has to be placed in direct contact with the scintillation medium, which comprises a solvent or solvents and a solute or solutes present in a small portion by weight of the solutions. In this interaction process most of the kinetic energy of the interacted beta particle is absorbed by the solvent and then transferred to the solute which emits scintillation photons, whose amount is proportional to the energy of the interacted beta particle. These scintillation photons are detected usually by two, in coincidence operating, photomultiplier tubes that produce electric pulses. The heights of the pulses are proportional to the amount of emitted scintillation photons and thus proportional to the energy of the interacted beta particle.

Traditional liquid scintillation counters are designed to count samples—one at a time—deposited with scintillation liquid into sample vials. The volume of the sample vial is typically 6 or 20 ml. The sample vials are deposited into vial racks, which have separate compartments for individual sample vials. The sample racks are placed on the conveyor of the automatic sample changer system of the counter.

Because the above mentioned liquid scintillation counter is designed to count vials, whose volume is up to 20 ml, serious difficulties are encountered, when the sample volume is only few hundred microliters or less. Typically, these samples are prepared in minivials which are then inserted into normal vials. In addition, the handling of separate sample vials is very time consuming and includes potential risks of mis-identification. The sample changing mechanism of such an instrument is also rather complicated, because the vial must be removed from the sample rack and must be positioned into a light tight radiation detection chamber, and after counting it must be returned to the same position in the sample rack.

A novel liquid scintillation counter, which counts samples directly from multi-well sample plates is shown in U.S. Pat. No. 5,061,853 (Lehtinen et al), which apparatus counts liquid scintillation or corresponding samples directly from sample plates which comprises several separate sample wells or vials. The apparatus has one or several detectors in order to count one or several samples at a time. The sample plate is placed, in the counting position or before counting position, manually or automatically on a rigid plate holder made of photon attenuating material and having holes for the wells of the sample plate. As a consequence, an optically isolated compartment is formed around each sample well of the sample plate. The walls of the holes are reflecting or scattering in order to guide the photons from the liquid scintillation sample to the detectors, built of two photomultiplier tubes operating in coincidence and situated on the opposite sides of the holes of the plate holder. The wells of the sample plate can be closed by an adhesive transparent tape. The apparatus can be used also for counting gamma radiation emitting samples if the holes of the sample plate are surrounded by gamma radiation sensitive detectors. A detailed construction of this kind of liquid scintillation counter is shown in PCT patent application no. PCT/F190/00124 (Sonne et al.).

Another novel liquid scintillation counter, which counts samples directly from multi-well sample plates is shown in U.S. Pat. No. 5,039,860 (Yrjönen et al.), which is an apparatus for counting liquid scintillation samples and which includes a sample plate containing a plurality of cup-shaped sample wells, a photomultiplier assembly over the tops of said cup-shaped sample wells, a photomultiplier assembly beneath the bottoms of said cup-shaped sample wells and light reflective tubes extending upwardly from said lower photomultiplier assembly and surrounding each cup-shaped sample well. In order to prevent light from travelling between the sample wells inside the material of the sample plate, one or both of the surfaces between the wells of the sample plate are painted black or this region is treated in some other way which prevents light from travelling between the sample wells inside the material of the sample plate.

Third novel scintillation counting system for in-situ measurement of radioactive samples in a multiple-well plate is presented under European Patent Publication Number 0425767A1 (VanCauter et al.). This apparatus is provided with multiple photomultiplier tubes positioned adjacent to the sample wells containing the scintillator for simultaneously measuring the radioactivity of multiple samples with only a single photomultiplier tube sensing the scintillations from each well and converting the sensed scintillations into corresponding electrical pulses. The electrical pulses from each photomultiplier tube are processed to discriminate between pulses attributable to sample events within the wells and pulses attributable to non-sample events such as photomultiplier tube noise. The discrimination is effected by determining whether a selected number of electrical pulses occurs with a prescribed time interval, the occurrence of the selected number of pulses within the prescribed time interval signifying a sample event. Only the electrical pulses attributable to sample events are supplied to a pulse analyzer.

U.S. Pat. No. 4,933,554 (Lehtinen et al.) describes a method of producing a carrier for a plurality of radioactive samples to be monitored in a liquid scintillation counter, where wells are provided in a rigid plate of a photon attenuating material in that holes disposed in a matrix configuration are covered from one side of the plate by a first photon permeable foil, sample carrying cut-out from sorption sheet on which samples have been deposited are placed in said wells, a scintillation fluid is added to the wells, and the wells are sealed by a second permeable foil to keep the cut-outs and the scintillation fluid within the respective wells.

A commercial product of a multi-well sample plate which is provided with light impermeable well walls but light permeable bottoms is manufactured by Polyfiltronics Ltd., UK. In this patent application this kind of plate is called as a bottom-window multi-well sample plate.

SUMMARY OF THE INVENTION

The present invention describes an arrangement for counting liquid scintillation sample on bottom-window multi-well sample plate.

DETAILED DESCRIPTION OF THE PREFERRED EMBODIMENTS

Figure 1:
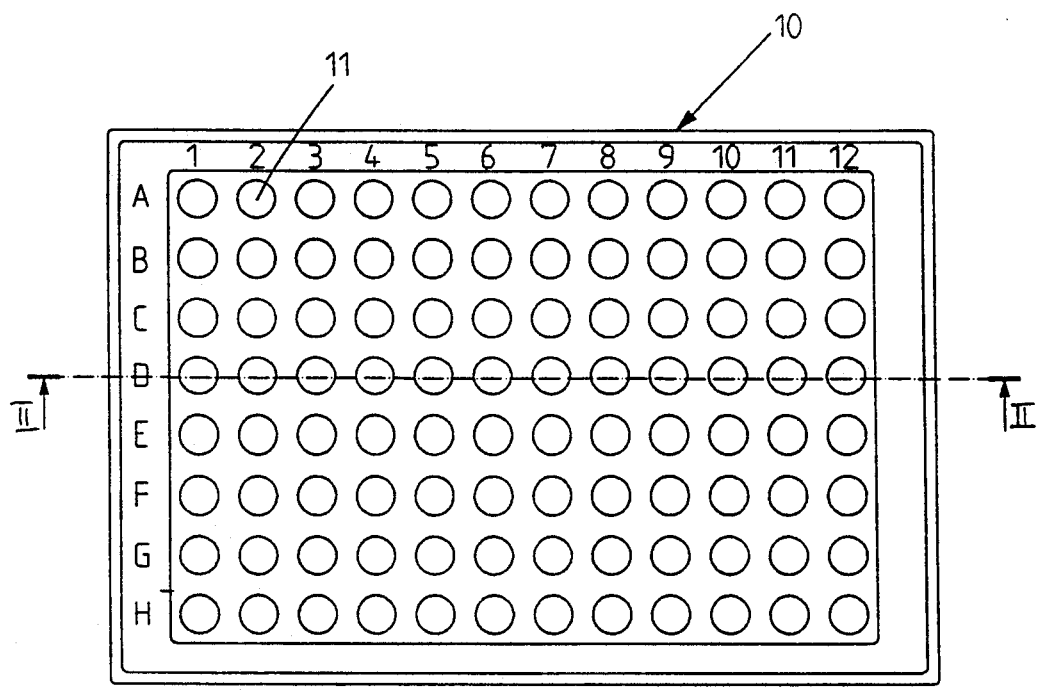
FIG. 1 shows a top view of a multi-well sample plate having in 8×12 matrix format 96 sample wells provided with light impermeable walls and light permeable bottoms.

In FIG. 1 there is shown a top view of a multi-well bottom-window sample plate 10 where 96 wells 11 are provided in an 8×12 matrix format in a rigid plate of a photon impermeable but reflective material.

Figure 2:
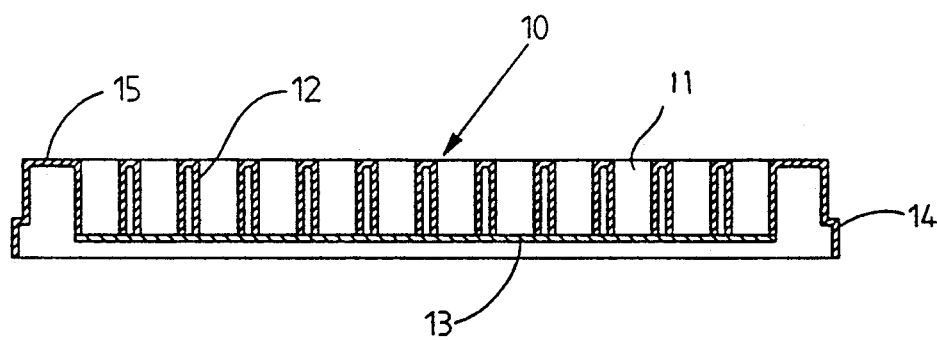
FIG. 2 shows a cross-sectional view of a multi-well sample plate according to FIG. 1 taken along the line II—II in FIG. 1.

FIG. 2 shows a side view of said 96-well sample plate taken along line II—II in FIG. 1. The walls 12 of the wells 11 are light impermeable and the bottom of the plate 10 is made of a photon permeable sheet 13.

Figure 3:
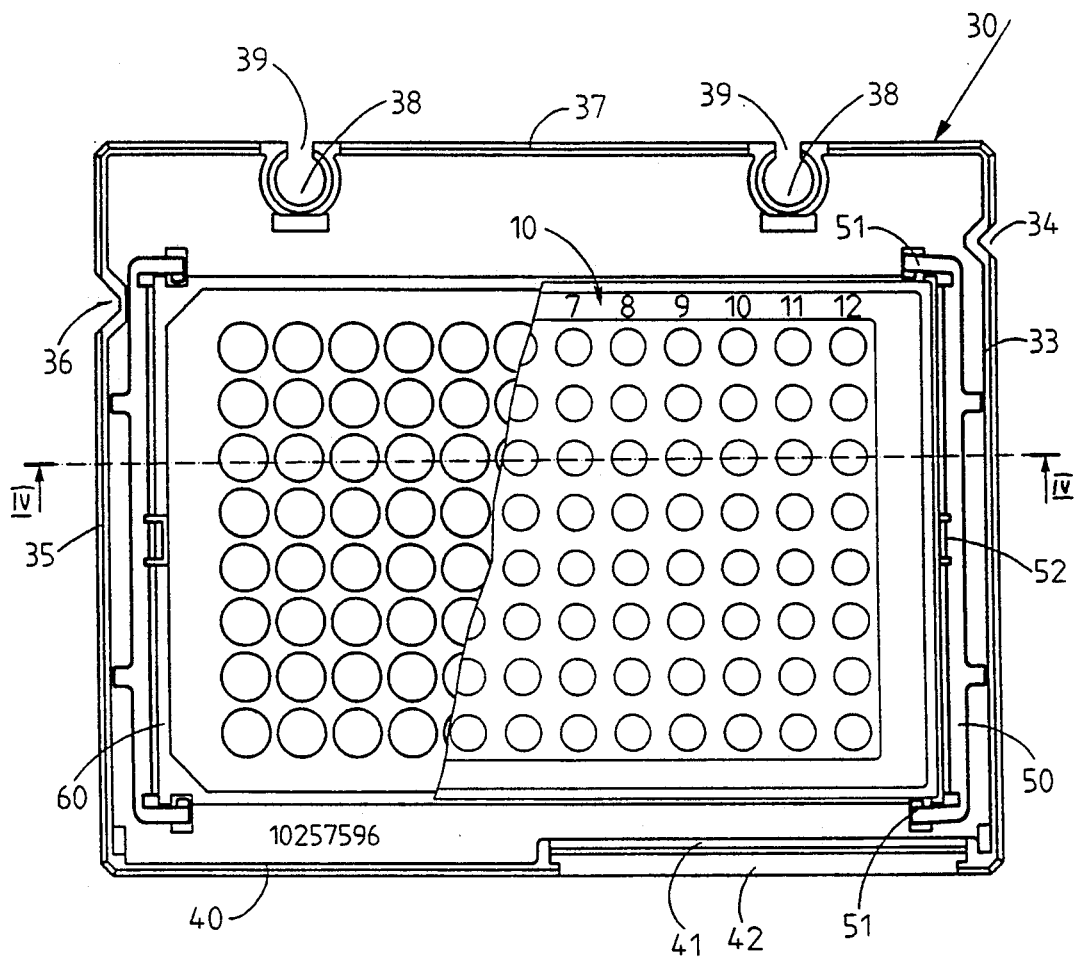
FIG. 3 shows a top view of a sample plate holder and a part of a multi-well sample plate according to FIG. 1 inserted into the sample plate holder.

FIG. 3 shows a sample plate holder 30 for counting liquid scintillation samples on the 96-well bottom-window sample plate 10 shown in FIG. 1 and 2 and produced by an injection moulding process from a light-impermeable material with high degree of reflectivity for scintillation light, for example a special-grade polycarbonate plastic containing high amount of white pigment.

Figure 4:
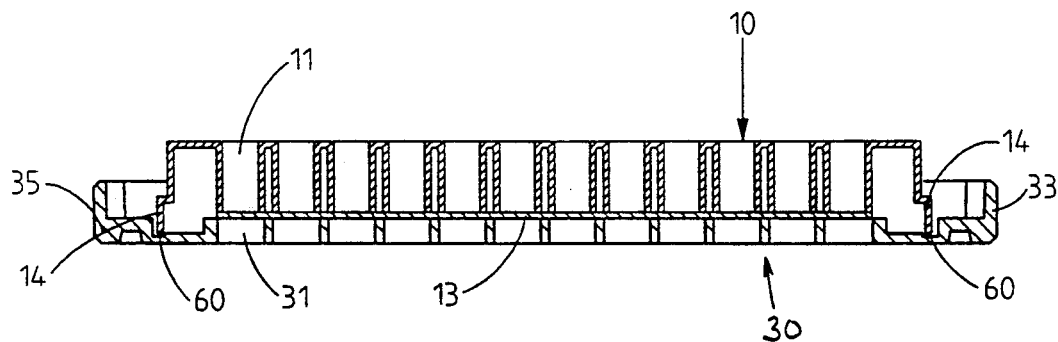
FIG. 4 shows a cross-sectional view of the sample plate holder and the sample plate according to FIG. 3 taken along the line IV—IV in FIG. 3.

FIG. 4 shows a side view of the 96-well sample plate holder taken along line IV—IV in FIG. 3 with a 96-well sample plate 10. The sample plate holder 30 is provided with circular through-holes 31 corresponding to the wells 11 of the sample plate 10.

As shown in FIG. 3 and FIG. 4, said sample plate holder 30 is provided with the first adaptation means 50 to engage the sample plate 10 in a single position. Said adaption means 50 comprises elastic lips 51 and a spring tab 52 in order to compensate for variations in the outer diameters of the sample plate 10 and a groove 60 in order to allow for variations in the height of the skirt 14 of the sample plate 10.

the second adaptation means comprising two identical pivot holes 38 at the rear side 37 of the sample plate holder 30 from its top to its bottom with open slits 39 adapting said sample plate holder 30 to the transportation system of the liquid scintillation counter in detail described in PCT Patent Application No. PCT/F190/00124 (Sonne et al.) and the first slot 34 at the right side 33 of the sample plate holder 30 in order to secure the correct position of the sample plate holder 30 in the storage compartment of said liquid scintillation counter and the second slot 36 at the left side 35 of the sample plate holder 30 for distinguishing different kinds of sample plates by the control system of the liquid scintillation counter according to the distance of the slot 36 from the rear side 37.

In addition the front side 40 of the sample plate holder 10 is provided with means 41 for carrying a detachable support plate 42, on which support plate at least one bar code label can be attached.

Figure 5:
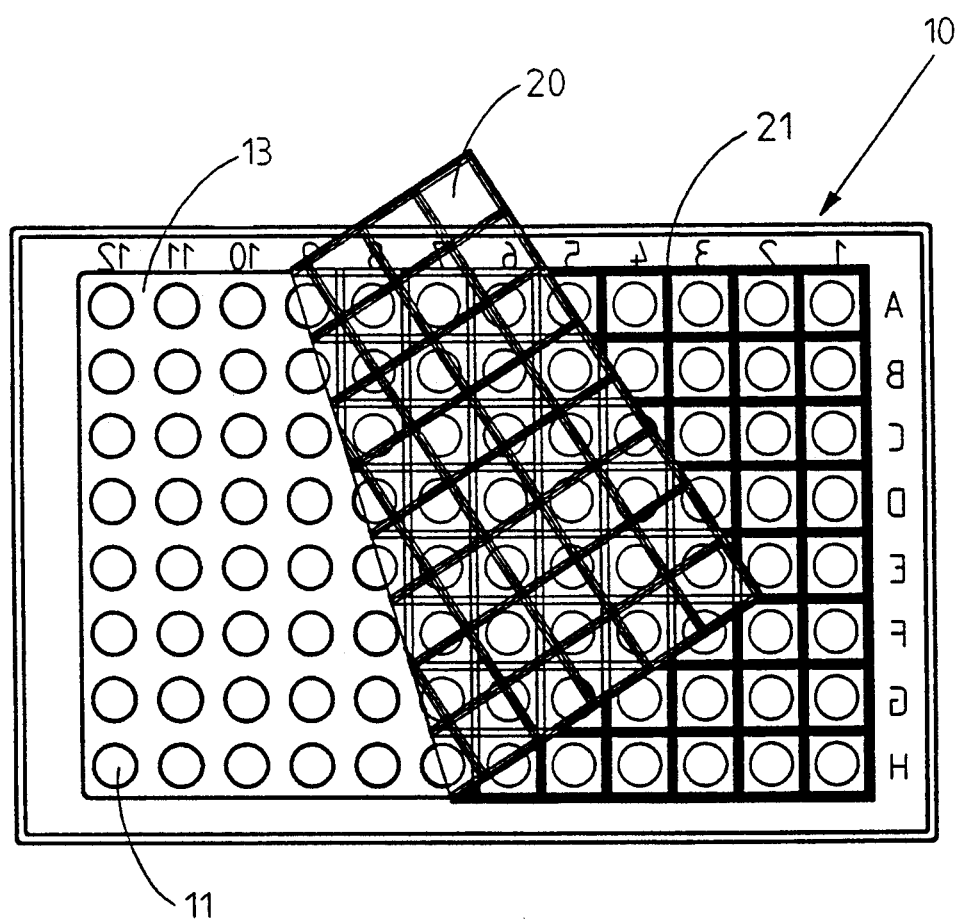
FIG. 5 shows a bottom view of the multi-well sample plate according to FIG. 1 with a transparent adhesive foil provided with printed lines partially attached on the bottom of the sample plate.

FIG. 5 shows that in order to prevent light from travelling between the sample wells inside the light permeable bottom sheet 13 a light permeable adhesive thin foil 20 provided with black lines 21 or other light passage preventing treatment is attached to the surface of the bottom sheet 13 so that said black lines 21 or other treatment is positioned between the wells 11 of the sample plate 10. If the samples on the sample plate 10 are measured only by the upper photomultiplier tubes, then said foil 20 is not transparent but reflective in order to reflect scintillation photon towards the upper photomultiplier tube. If the samples on the sample plate 10 are measured only by the lower photomultiplier tubes, then said reflective foil 20 is attached to the upper side 15 of the sample plate 10.

Figure 6:
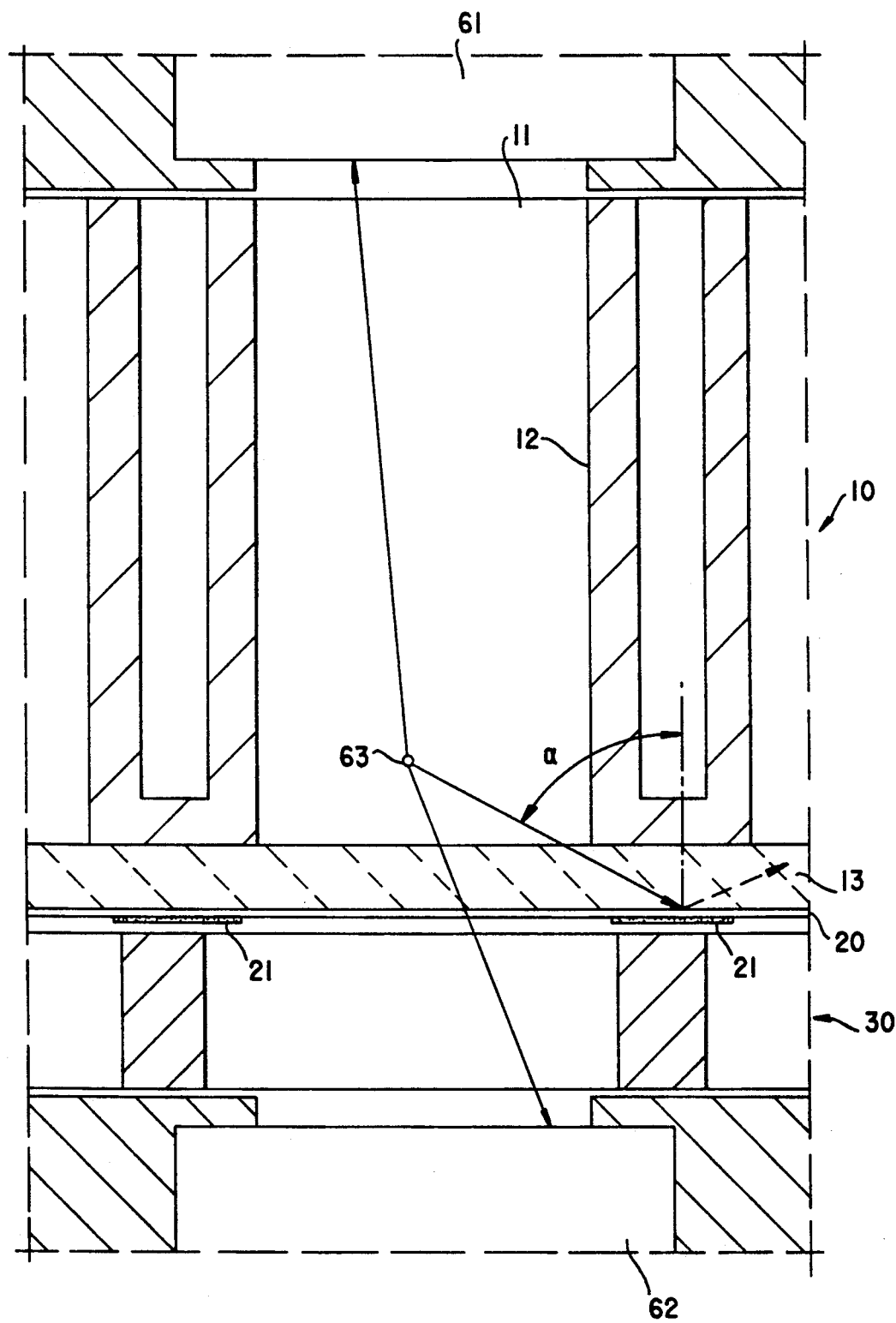
FIG. 6 shows a detailed cross-sectional view of the sample plate holder and the sample plate provided with a transparent adhesive foil at the bottom inserted between two photo detectors.

FIG. 6 shows a detailed cross-sectional view of the sample plate holder 30 and the sample plate 10 provided with a transparent adhesive foil 20 at the bottom inserted between two photo detectors 61 and 62. Scintillation light 63 is detected by the both detectors 61 and 62 in coincidence operation.

Scintillation light 63 penetrates straight through the photon permeable sheet 13 at the bottom of the sample plate 10 if the angle α is less than the Brewster's angle which is well-known in the optics. But if the angle α is equal or more than the Brewster's angle the scintillation light 63 reflects and goes to the next well, thereby beside this well affecting a cross talk phenomena.

Therefore according to the invention the black lines 21 are printed into the transparent adhesive foil 20 preventing reflection and the cross talk as well. By the aid of these lines the amount of cross talk is less than 10% of that without the black lines.

Figure 7:
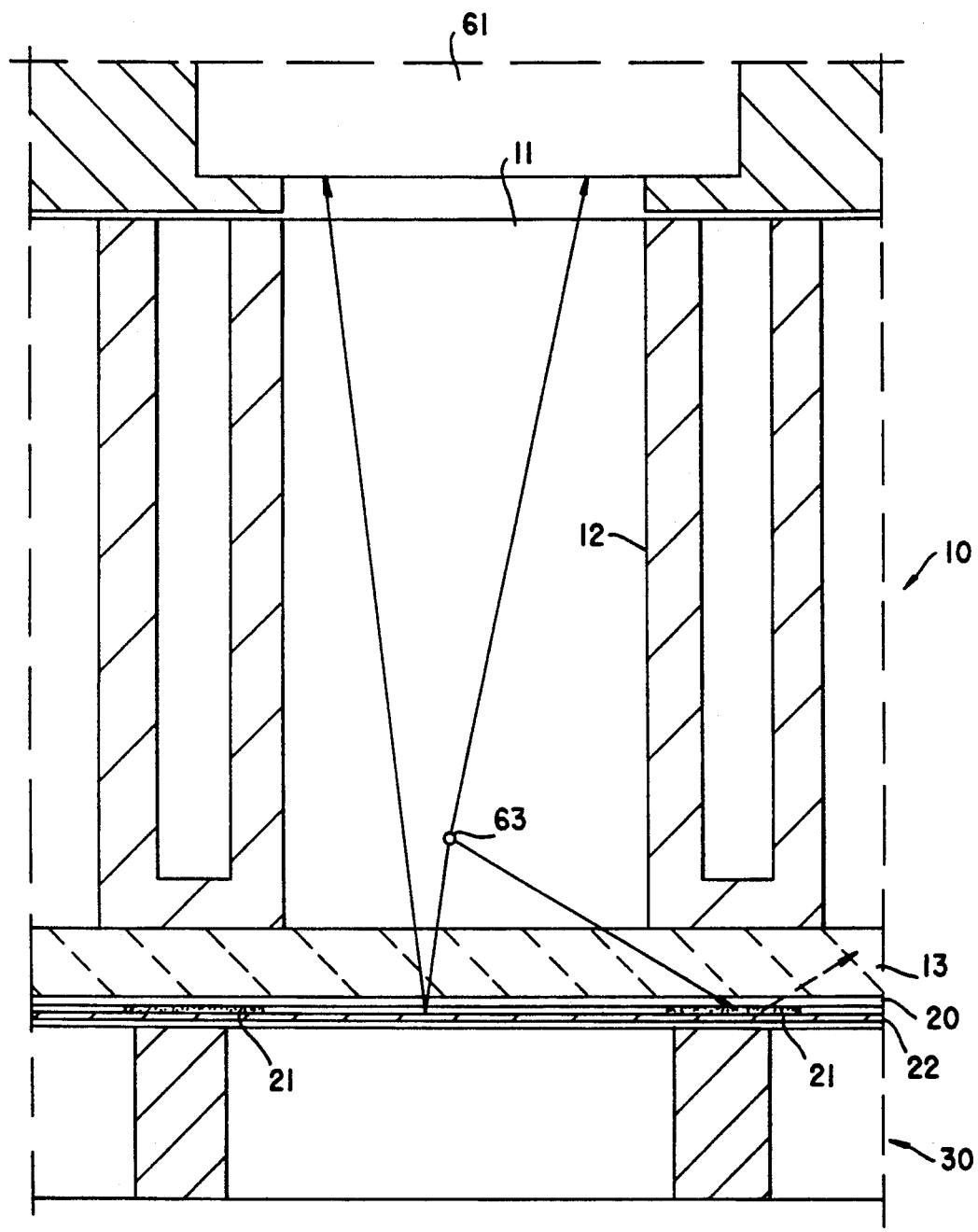
FIG. 7 shows a detailed cross-sectional view of the sample plate holder and the sample plate provided with a transparent adhesive foil and a reflecting foil at the bottom inserted under a photo detector.

FIG. 7 shows a detailed cross-sectional view of the sample plate holder 30 and the sample plate 10 provided with a transparent adhesive foil 20 and a reflecting foil 22 at the bottom. The sample plate 10 and the sample plate holder 30 have been inserted under a photo detector 61. All the scintillation light 63 will be detected by the detector 61 because the reflecting foil 22 reflects all the photons upwards. For preventing light passage between the sample wells or the cross talk between the two wells beside each other through the photon permeable bottom sheet 13 is prevented by the black lines 21 in the transparent adhesive foil 20.

Figure 8:
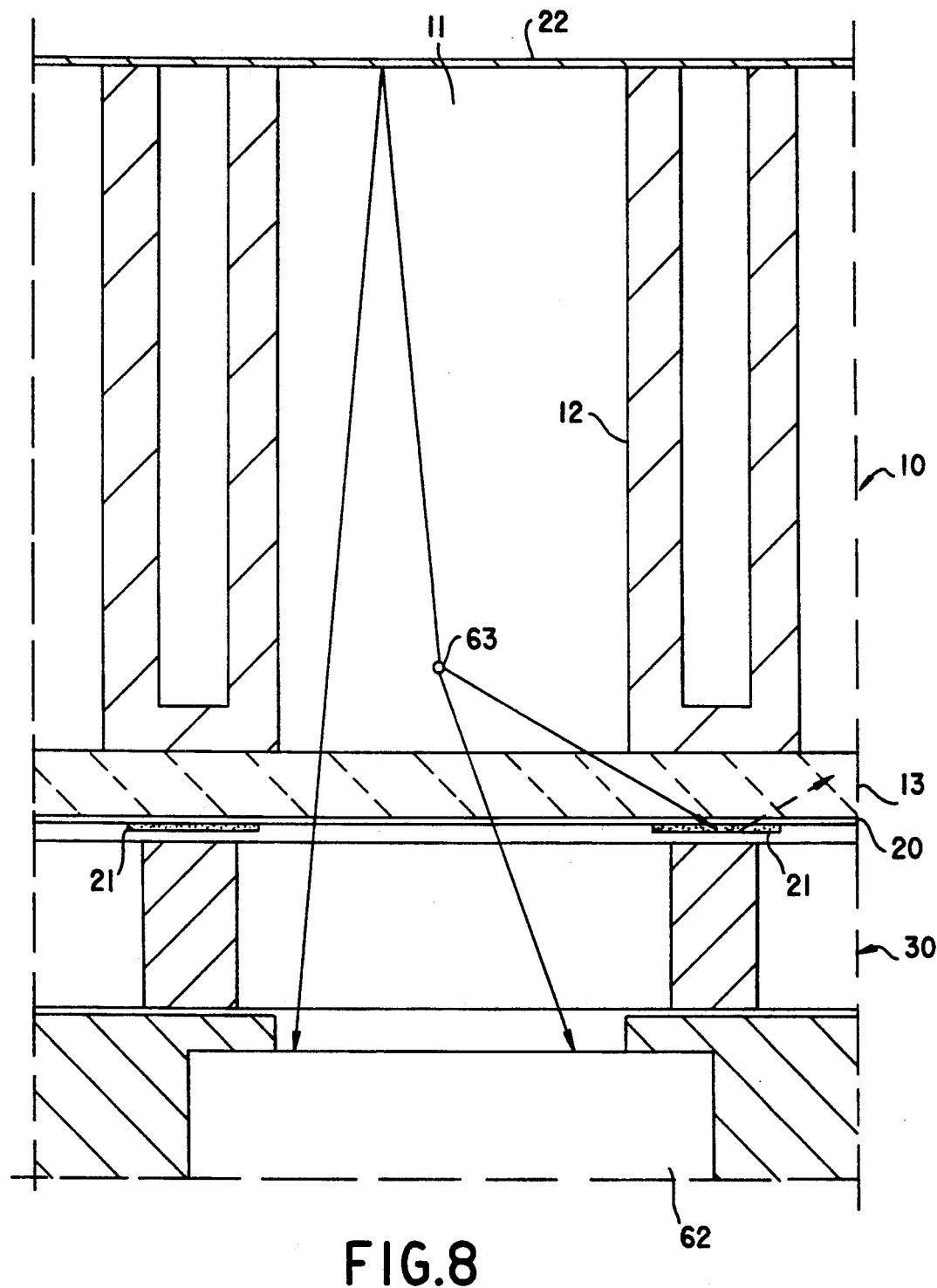
FIG. 8 shows a detailed cross-sectional view of the sample plate holder and the sample plate provided with a transparent adhesive foil at the bottom and a reflecting foil on top inserted above a photo detector.

FIG. 8 shows a detailed cross-sectional view of the sample plate holder 30 and the sample plate 10 provided with a transparent adhesive foil 20 at the bottom and a reflecting foil 22 on top. The sample plate 10 and the sample plate holder 30 have been inserted above a photo detector 62. With this arrangement all the scintillation light 63 will be detected by the detector 62 and the cross talk is prevented by the black lines 21 in the transparent adhesive foil 20.

According to an another embodiment of the invention the transparent adhesive foil 20 with black lines 21 is covered by a reflecting surface so that the transparent foil and the reflecting foil are attached together. It is also possible that the black lines have been printed straight on the reflecting foil. In that case no transparent adhesive foil is necessary.

The invention is not confined to the above embodiments alone, but it may show even considerable variations within the scope of the patent claims.

We claim:

1. An apparatus for counting liquid scintillation samples, the apparatus comprising:
    (a) a liquid scintillation counter comprising at least one photomultiplier tube,
    (b) a sample plate comprising (i) a plurality of sample wells, each well having light impermeable side walls, and (ii) a light permeable bottom sheet which covers and forms the bottoms of said sample wells,
    (c) an adapter having a first adaptation means for adapting for variations in size of said sample plate and a second adaption means for adapting for transportation of said sample plate in said liquid scintillation counter.

2. An apparatus according to claim 1 wherein said adapter is a sample plate holder and said first adaptation means comprises elastic lips and a spring tab to compensate for variations in outer dimensions of the sample plate, and a bottom groove to allow for variations in height of a skirt of the sample plate.

3. An apparatus according to claim 1 wherein said adapter is a sample plate holder and said second adaptation means comprises two pivot holes with open slits at one side.

4. An apparatus according to claim 1 wherein said adapter is a sample plate holder and said second adaptation means comprises a first slot at a right side of the sample plate holder and a second slot at a left side of the sample plate holder.

5. An apparatus according to claim 2 wherein the permeable bottom sheet of said sample plate is covered with a light permeable adhesive foil provided with black lines positioned between the sample wells.

6. An apparatus according to claim 2 wherein the permeable bottom sheet of the sample plate is covered with a light reflective adhesive foil provided with black lines positioned between the sample wells.

7. An apparatus according to claim 2 wherein an upper side of the sample plate is covered with a light reflective adhesive foil.

* * * * *